US006948026B2

(12) United States Patent
Keays

(10) Patent No.: US 6,948,026 B2
(45) Date of Patent: Sep. 20, 2005

(54) ERASE BLOCK MANAGEMENT

(75) Inventor: Brady L. Keays, Half Moon Bay, CA (US)

(73) Assignee: Micron Technology, Inc., Boise, ID (US)

( * ) Notice: Subject to any disclaimer, the term of this patent is extended or adjusted under 35 U.S.C. 154(b) by 354 days.

(21) Appl. No.: 09/938,782

(22) Filed: Aug. 24, 2001

(65) Prior Publication Data

US 2003/0041210 A1 Feb. 27, 2003

(51) Int. Cl.[7] .............................................. G06F 12/00
(52) U.S. Cl. ...................... 711/103; 711/154; 711/156; 711/162; 711/170; 365/185.33; 365/185.29; 714/6
(58) Field of Search ................................ 711/103, 154, 711/156, 162, 170; 365/185.01, 185.09, 185.11, 185.29, 185.33; 714/6

(56) References Cited

U.S. PATENT DOCUMENTS

| | | | | |
|---|---|---|---|---|
| 3,576,982 A | * | 5/1971 | Duke .............................. | 714/6 |
| 5,608,684 A | * | 3/1997 | Reasoner et al. ........... | 365/228 |
| 5,758,325 A | * | 5/1998 | Lohry et al. .................. | 705/12 |
| 5,923,827 A | * | 7/1999 | Matsuo et al. .............. | 358/1.17 |
| 5,933,847 A | * | 8/1999 | Ogawa ........................ | 711/103 |
| 5,966,720 A | * | 10/1999 | Itoh et al. ....................... | 711/1 |
| 6,144,607 A | * | 11/2000 | Sassa ..................... | 365/230.03 |
| 6,209,069 B1 | * | 3/2001 | Baltar ......................... | 711/163 |
| 6,278,654 B1 | | 8/2001 | Roohparvar | |
| 6,304,497 B1 | | 10/2001 | Roohparvar | |
| 6,307,779 B1 | | 10/2001 | Roohparvar | |
| 6,345,333 B1 | * | 2/2002 | Sassa et al. .................. | 711/103 |
| 6,411,404 B1 | * | 6/2002 | Matsuo et al. .............. | 358/444 |
| 6,427,186 B1 | * | 7/2002 | Lin et al. ..................... | 711/103 |
| 6,513,095 B1 | * | 1/2003 | Tomori ....................... | 711/103 |
| 6,772,274 B1 | * | 8/2004 | Estakhri ..................... | 711/103 |
| 6,845,438 B1 | * | 1/2005 | Tanaka et al. .............. | 711/206 |
| 2001/0029565 A1 | * | 10/2001 | Kaki et al. .................. | 711/103 |
| 2002/0013879 A1 | * | 1/2002 | Han ............................ | 711/103 |
| 2002/0026566 A1 | * | 2/2002 | Awada et al. ............... | 711/162 |

* cited by examiner

Primary Examiner—Hong Kim
(74) Attorney, Agent, or Firm—Leffert Jay & Polglaze, P.A.

(57) ABSTRACT

An improved Flash memory device with a distributed erase block management (EBM) scheme is detailed that enhances operation and helps minimize write fatigue of the floating gate memory cells of the Flash memory device. In the prior art, erase block management of a Flash memory device, which provides logical sector to physical sector mapping and provides a virtual rewriteable interface for the host, requires that erase block management data be kept in specialized EBM data tables to keep the state of the Flash memory device in case of loss of power. This placement of EBM data in a separate erase block location from the user data slows the Flash memory operation by requiring up to two writes and/or block erasures for every update of the user data. Additionally, one of the goals of the EBM control is to minimize write fatigue of the non-volatile floating gate memory cells of the Flash memory device erase blocks by re-mapping and distributing heavily rewritten user data sectors in a process called load leveling so that no one erase block gets overused too quickly and reduce the expected lifespan of the Flash memory device. The EBM data structures, however, are some of the most heavily rewritten non-volatile floating gate memory cells in the device and thus, while helping to reduce write fatigue in the Flash memory device, are some of the data structures most susceptible to the process of fatigue. The Flash memory device of the invention combines the EBM data in a user data erase block by placing it in an EBM data field of the control data section of the erase block sectors. Therefore distributing the EBM data within the Flash memory erase block structure. This allows the Flash memory to update and/or erase the user data and the EBM data in a single operation, to reduce overhead and speed operation. The Flash memory also reduces the process of EBM data structure write fatigue by allowing the EBM data fields to be load leveled by rotating them with the erase blocks they describe.

50 Claims, 8 Drawing Sheets

EBM Entry Type 1, Logical Block of Sectors

EBM Entry Type 2, Block of Repeated Logical Sector Address

ERASE BLOCK MANAGEMENT

TECHNICAL FIELD OF THE INVENTION

The present invention relates generally to integrated circuits and in particular the present invention relates to erase block management of Flash memory devices.

BACKGROUND OF THE INVENTION

Memory devices are typically provided as internal storage areas in the computer. The term memory identifies data storage that comes in the form of integrated circuit chips. There are several different types of memory used in modern electronics, one common type is RAM (random-access memory). RAM is characteristically found in use as main memory in a computer environment. RAM refers to read and write memory; that is, you can both write data into RAM and read data from RAM. This is in contrast to ROM, which permits you only to read data. Most RAM is volatile, which means that it requires a steady flow of electricity to maintain its contents. As soon as the power is turned off, whatever data was in RAM is lost.

Computers almost always contain a small amount of read-only memory (ROM) that holds instructions for starting up the computer. Unlike RAM, ROM cannot be written to. An EEPROM (electrically erasable programmable read-only memory) is a special type non-volatile ROM that can be erased by exposing it to an electrical charge. EEPROM comprise a large number of memory cells having electrically isolated gates (floating gates). Data is stored in the memory cells in the form of charge on the floating gates. Charge is transported to or removed from the floating gates by specialized programming and erase operations, respectively.

Yet another type of non-volatile memory is a Flash memory. A Flash memory is a type of EEPROM that can be erased and reprogrammed in blocks instead of one byte at a time. A typical Flash memory comprises a memory array, which includes a large number of memory cells. Each of the memory cells includes a floating gate field-effect transistor capable of holding a charge. The data in a cell is determined by the presence or absence of the charge in the floating gate. The cells are usually grouped into sections called "erase blocks". Each of the cells within an erase block can be electrically programmed in a random basis by charging the floating gate. The charge can be removed from the floating gate by a block erase operation, wherein all floating gate memory cells in the erase block are erased in a single operation.

Because all the cells in an erase block of a Flash memory device must be erased all at once, one cannot directly rewrite a Flash memory cell without first engaging in a block erase operation. Erase block management (EBM) provides an abstraction layer for this to the host, allowing the Flash device to appear as a freely rewrite-able device. Erase block management also allows for load leveling of the internal floating gate memory cells to help prevent write fatigue failure. Write fatigue is where the floating gate memory cell, after repetitive writes and erasures, no longer properly erases and removes charge from the floating gate. Load leveling procedures increase the mean time between failure of the erase block and Flash memory device as a whole.

As stated above, the erase block management routines provide the necessary linkage between the host and the internal Flash memory device erase block array. Logically mapping logical sectors to physical sectors on the Flash device and managing block erasure. In many modern Flash memory devices implementations, the host interface and erase block management routines additionally allow the Flash memory device to appear as a read/write mass storage device (i.e., a magnetic disk) to the host.

One such approach is to conform the interface to the Flash memory to be identical to a standard interface for a conventional magnetic hard disk drive allowing the Flash memory device to appear as a block read/write mass storage device or disk. This approach has been codified by the PCMCIA standardization committee, which promulgated a standard for supporting Flash memory systems with a hard disk drive protocol. A Flash memory device or Flash memory card (including one or more Flash memory array chips) whose interface meets this standard can be plugged into a host system having a standard DOS or compatible operating system with a PCMCIA-ATA (or standard ATA) interface.

Many of the modern computer operating systems, such as "DOS" (Disk Operating System), were developed to support the physical characteristics of hard drive structures; supporting file structures based on heads, cylinders and sectors. The DOS software stores and retrieves data based on these physical attributes. Magnetic hard disk drives operate by storing polarities on magnetic material. This material is able to be rewritten quickly and as often as desired. These characteristics have allowed DOS to develop a file structure that stores files at a given location which is updated by a rewrite of that location as information is changed. Essentially all locations in DOS are viewed as fixed and do not change over the life of the disk drive being used therewith, and are easily updated by rewrites of the smallest supported block of this structure. A sector (of a magnetic disk drive) is the smallest unit of storage that the DOS operating system supports. In particular, a sector has come to mean 512 bytes of information for DOS and most other operating systems in existence. Flash memory systems that emulate the storage characteristics of hard disk drives are preferably structured to support storage in 512 byte blocks along with additional storage for overhead associated with mass storage, such as ECC (error correction code) bits and/or redundant bits.

To not lose the state of the various erase blocks in a Flash memory device, erase block management routines keep summary erase block management data, such as available blocks, invalid blocks to be erased, logical to physical address mapping, valid (full) blocks, partially full block, and etc. This erase block management data in a Flash device of the prior art is kept in special non-volatile tables within the Flash device. To improve performance of the device, this erase block management data is copied into internal RAM data structures to improve overall device operation. The non-volatile tables, however, must be updated with each change made to the Flash memory device erase blocks and erase block management data to prevent loss of the Flash memory state data in case of power failure.

The update to the non-volatile erase block management data table often requires that the non-volatile erase block management data table themselves be erased before they can be updated. This introduces additional overhead in the Flash memory device update process, requiring at least two or more Flash block writes and/or erases for each data write to the Flash memory; one for the user data and one for the erase block management data, with possible block erasures required. This has the effect of slowing overall Flash device operation. In addition, with the concentration of writes and erasures in the non-volatile erase block management data tables, the non-volatile erase block management data tables are thus, ironically, some of most likely to see errors from floating gate memory cell write fatigue.

FIG. 1 shows a simplified diagram of a Flash memory of the prior art. Internally to the Flash memory device a control state machine 110 directs internal operation of the Flash memory device; managing the Flash memory array 112 and updating RAM control registers and tables 114 and the non-volatile erase block management registers and tables 128. The RAM control registers and tables 114 are loaded at power up from the non-volatile erase block management registers and tables 128 by the control state machine 110. The Flash memory array 112 contains a sequence of erase blocks 116. Each erase block 116 contains a series of sectors 118 that include a user data space 120 and a control data space 122. The control data space 122 contains overhead information for operation of the sector, such as an error correction code (not shown). The user data space 120 in each sector 118 is typically 512 bytes long. In a typical Flash memory device 100 each erase block 116 typically contains 128 sectors 118.

For the reasons stated above, and for other reasons stated below which will become apparent to those skilled in the art upon reading and understanding the present specification, there is a need in the art for a Flash memory device that has an erase block management method and data that allows for single write/erase updates of the Flash memory device. There is also a need in the art for an erase block management method and data that has improved write fatigue characteristics.

SUMMARY OF THE INVENTION

The above-mentioned problems with memory device initialization and other problems are addressed by the present invention and will be understood by reading and studying the following specification.

In one embodiment, a Flash memory device comprises a control circuit, a memory array with a plurality of floating gate memory cells arranged in a plurality of erase blocks, wherein each erase block of the plurality of erase blocks contains 128 sectors, and each sector contains a user data section of 512 bytes, an erase block management data structure formed into a control data section of a first six sectors of each erase block of the plurality of erase blocks, wherein each control data section of the first six sectors contains a 6 byte erase block management data field, and a plurality of RAM control registers.

In another embodiment, a Flash memory device comprises a memory array containing a plurality of floating gate memory cells arranged in a plurality of erase blocks, and an erase block management data structure arranged in each erase block of the plurality of erase blocks.

In yet another embodiment, a Flash memory device comprises a memory array containing a plurality of floating gate memory cells divided into a plurality of erase blocks, wherein each of the plurality of erase blocks is further divided into a plurality of sectors, and an erase block management data structure arranged in each erase block of the plurality of erase blocks.

In a further embodiment, a Flash memory device comprises a memory array containing a plurality of floating gate memory cells arranged in a plurality of erase blocks, and an erase block management data structure arranged in each erase block of the plurality of erase blocks, wherein each erase block of the plurality of erase blocks has an erase block state that is recorded in the erase block management data structure of the erase block.

In yet a further embodiment, a Flash memory device comprises a memory array containing a plurality of floating gate memory cells arranged in a plurality of erase blocks, a control circuit, and an erase block management data structure arranged in each erase block of the plurality of erase blocks.

In another embodiment, a system comprises a host coupled to a Flash memory device. Wherein the Flash memory device comprises, a memory array containing a plurality of floating gate memory cells arranged in a plurality of erase blocks, and an erase block management data structure arranged in each erase block of the plurality of erase blocks.

A method of making a Flash memory device comprises forming a memory array containing a plurality of floating gate memory cells arranged in a plurality of erase blocks, and forming an erase block management data structure in each erase block of the plurality of erase blocks.

A method of operating a Flash memory device comprises storing an erase block management data structure in each erase block of a plurality of erase blocks of a Flash memory array.

Another method of operating a Flash memory device comprises storing a fault tolerant erase block management data structure in a plurality of sectors of each erase block of a plurality of erase blocks of a Flash memory array.

A further method of operating a Flash memory device comprises placing an erase block management data structure in at least one sector of each erase block of a plurality of erase blocks of a Flash memory array, and recording an erase block state in the erase block management data structure in the at least one sector of each erase block of the plurality of erase blocks.

Yet another method of operating a Flash memory device comprises placing an erase block management data structure in at least one sector of each erase block of a plurality of erase blocks of a Flash memory array, and mapping a logical address to a physical erase block and a sector address of the plurality of erase blocks.

DETAILED DESCRIPTION OF THE INVENTION

In the following detailed description of the preferred embodiments, reference is made to the accompanying drawings that form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

To overcome the reliance on separate centralized non-volatile erase block management tables with the above detailed issues of write fatigue, dual NV block writes for user data and EBM data, and the operational overhead thereof, a Flash memory of the present invention manages the EBM data in a decentralized approach. A Flash memory embodiment of the present invention incorporates the erase block management information for an individual erase block (EB) in an extended area of the control data section of the first several sectors in the erase block. This allows for single write nonvolatile block updates and block writes. These single write block operations are inherently faster resulting in an improved performance.

The distributed EBM data contained in the erase blocks is also inherently load leveling and resistant to write fatigue. If the EBM fields of an erase block are damaged or succumb to write fatigue, only that write block is affected. The erase block management system of a Flash memory embodiment of the present invention can continue to operate with the EBM information fields in the unaffected erase blocks.

Figure 1:
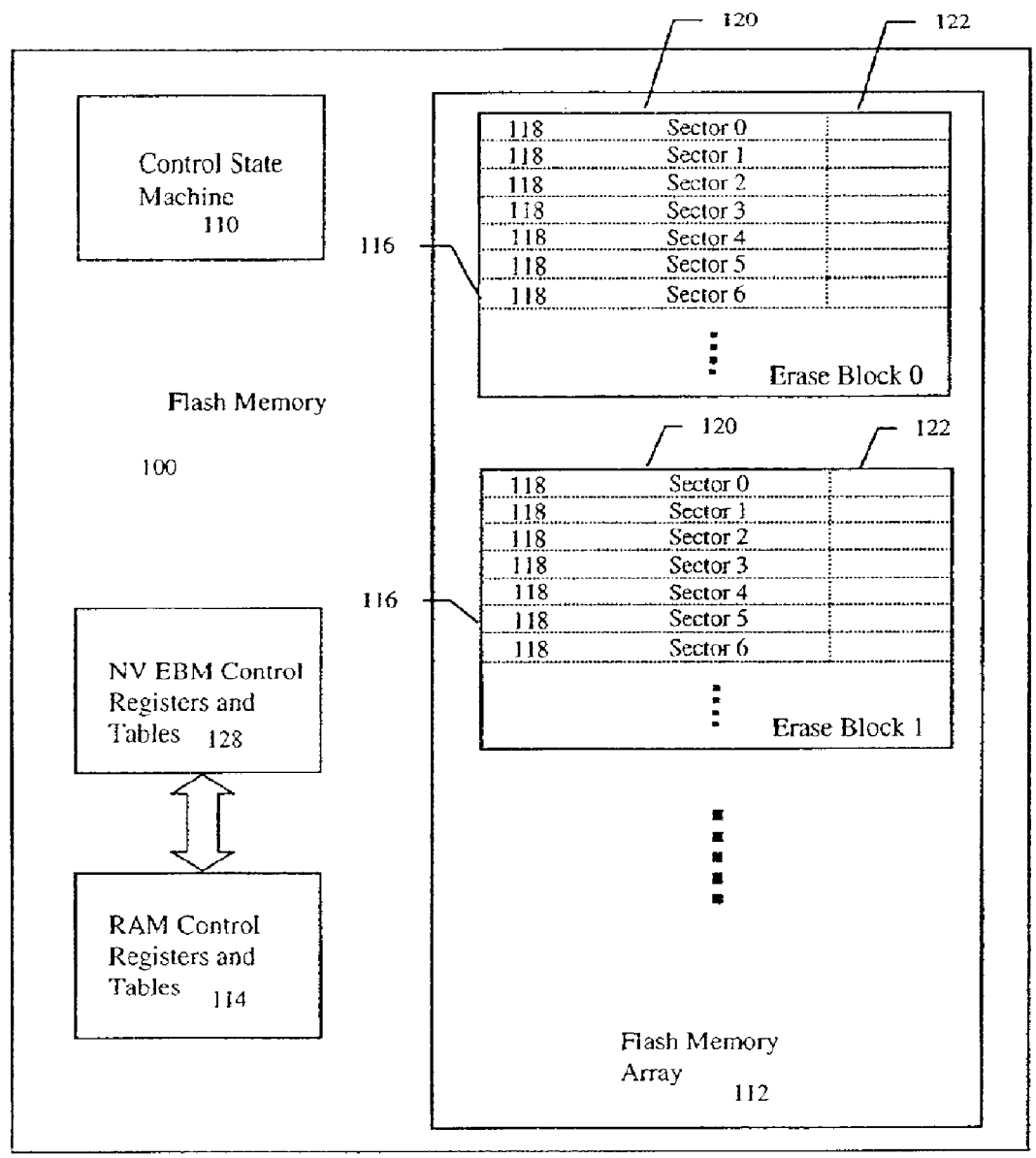
FIG. 1 details a prior art Flash memory.
Figure 2:
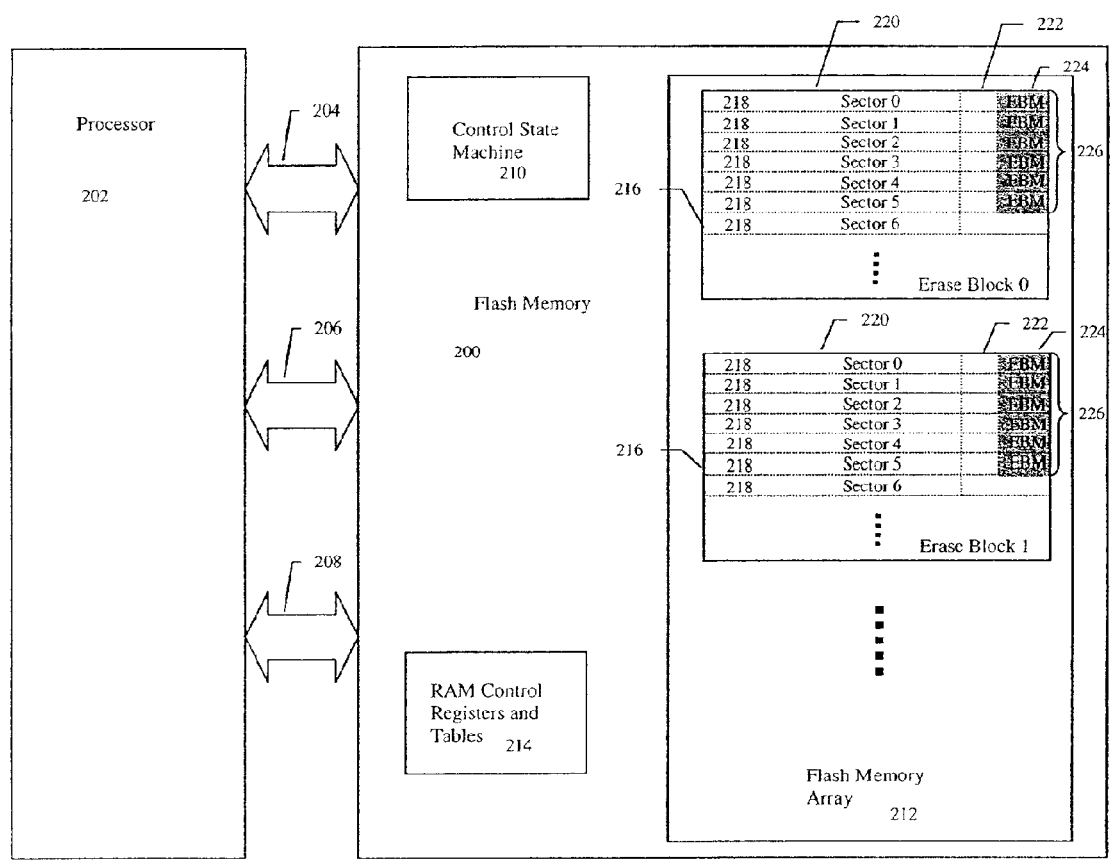
FIG. 2 details a memory system with Flash memory of the present invention.

Shown in FIG. 2 is a simplified diagram of a Flash memory device embodiment of the present invention 200 coupled to a processor 202 with an address 204, control 206, and data bus 208. Internally to the Flash memory device a control state machine 210 directs internal operation of the Flash memory device; managing the Flash memory array 212 and updating RAM control registers and tables 214. The Flash memory array 212 contains a sequence of erase blocks 216. Each erase block 216 contains a series of sectors 218 that contain a user data space 220 and a control data space 222. The control data space 222 contains overhead information for operation of the sector 218, such as an error correction code (not shown) or an erase block management data field area 224. The first six sectors 226 of an erase block 216 of a Flash memory device 200 embodiment of the present invention contain erase block management data fields 224 that contain the decentralized erase block management data in their control data space 222. The RAM control registers and tables 214 are loaded at power up from the erase block management data fields 224 held in the first six sectors 226 of each erase block 216 by the control state machine 210. The user data space 220 in each sector 218 is typically 512 bytes long. In a Flash memory device 200 embodiment of the present invention each erase block 216 typically contains 128 sectors 218 and has 6 byte EBM data fields 224 in each sector 218. It is noted that other formats for the erase blocks 216 and sectors 218 are possible and should be apparent to those skilled in the art with benefit of the present disclosure.

Figure 3:
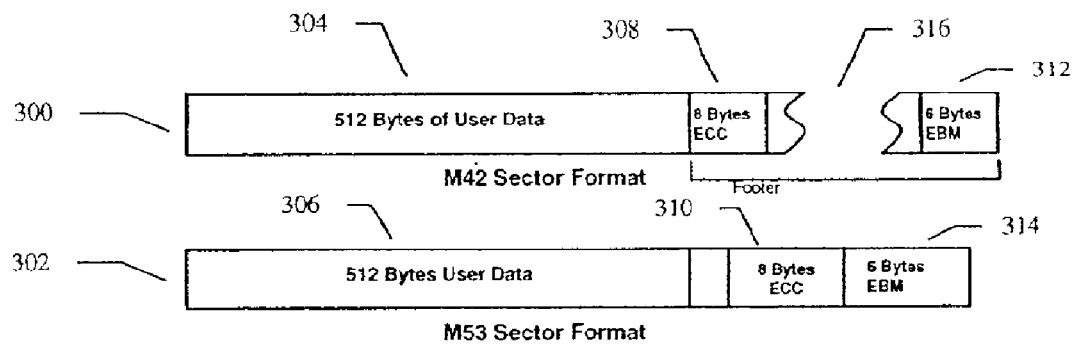
FIG. 3 details sector formats of a Flash memory of the present invention.

FIG. 3 further details two examples 300, 302 of the many possible sector formats for a Flash memory erase block of the present invention. Both the M42 sector format 300 and the M53 sector format 302 contain space for 512 bytes of user data 304, 306, 8 bytes of ECC 308, 310, and 6 bytes of EBM data 312, 314. The formats differ, however, in that the M42 sector format 300 contains additional data space for format specific functions 316, while the M53 sector format 302 does not contain such space. Other sector formats are of course possible and should be apparent to those skilled in the art with the benefit of the present disclosure.

Figure 4:
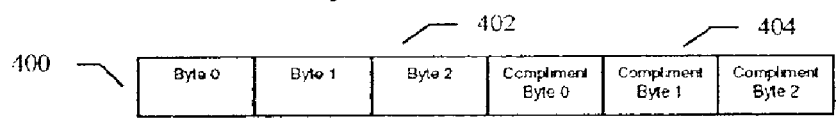
FIG. 4 details the EBM bytes of a sector of a Flash memory of the present invention.

In FIG. 4 is shown a diagram of a EBM data field of 6 bytes 400 as would be used in a sector of an erase block of an embodiment of the present invention. In the EBM data field bytes 0 to 2, 402, contain EBM data. While the EBM data field bytes 3 to 6, 404, contain the 1s complement of the data in EBM data field bytes 0 to 2, 402, for error redundancy purposes.

Figures 5, 6:
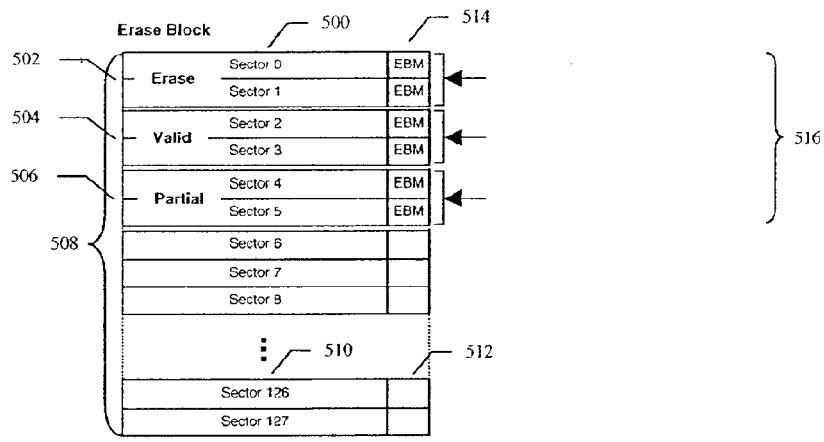
FIG. 5 details sector formats and states of an erase block of a Flash memory of the present invention.
FIG. 6 details a table showing the possible erase block states and the EMB sectors and field values that correspond.

In FIG. 5, an erase block 500 of 128 sectors 508 is detailed. For the erase block management method detailed herein, the erase block management fields of the first six sectors of an erase block of a Flash memory of the present invention are paired together in 3 groups of 2 sectors each 502, 504, 506. This improves the EBM data redundancy and general fault tolerance of the Flash memory device. Each sector 508 of the erase block 500 has a 512 byte user data space 510 and a control data space 512. The control data space 512 contains an EBM data field of 6 bytes 514. The EBM data fields of the first six sectors 516 are utilized in erase block management in a Flash memory device of the present invention. In the first six sectors 516, sectors 0 and 1 are paired 502, sectors 2 and 3 are paired 504, and sectors 4 and 5 are paired 506. Identical EBM data is redundantly written to the EBM data fields of each sector in each pair. As long as one sector in the pair can be read the EBM data stored in the sector pair is considered valid. It is noted that other sector EBM data field formats and erase block EBM field arrangements are possible and should be apparent to those skilled in the art with benefit of the present disclosure.

In a Flash memory device of the present invention, the erase blocks can have one of four states: "invalid" (unavailable and in need of block erasure), "erased" (available for use), "partially filled" (partially written with user data), and "fully valid" (full of user data). FIG. 6 shows a table 600 which details the state of an erase block 602 and the contents of the EBM fields 604 of each pair of the first six sectors of the erase block. The state of any erase block of an embodiment of the present invention can be determined at any time by reading the contents of each pair of the first six sectors of the erase block. The erase block management firmware software of a Flash memory device of the present invention reads these fields for each erase block of the device upon power up and retains the information in the internal RAM tables to improve operation performance.

As shown in the table of FIG. 6, when a Flash memory device embodiment of the present invention is in the "invalid" state 612, the EBM data fields of sectors 0/1 606, sectors 2/3 608, and sectors 4/5 610 will have an "invalid" pattern written into each sector. The invalid pattern for the present embodiment of a Flash memory device of the present invention is that of all zeros.

An erase block in the "erased" state 614 will have the hexadecimal pattern "AA55AA" and its complement written into sectors 0/1 606. The remaining sectors, sectors 2/3 608 and sectors 4/5 610, will be in the "erased" state; which is a pattern of hexadecimal "FFFFFF" for the present embodiment of a Flash memory of the present invention. The presence of the "AA55AA" pattern is required to indicate the successful completion of the erasure procedure on the erase block.

For an erase block in the "partially filled" state 616, the erase block will have the hexadecimal pattern "AA55AA" and its complement written into sectors 0/1 606, and sectors 4/5 610 will contain a valid block identifier and its complement. The block identifier indicates the logical address or address range and type of user data written to the erase block. The sectors 2/3 608 will be in the "erased" state, indicating that the erase block is not closed and that space remains to be written. The partially filled state allows for any number of physical sectors between 0 and 128 to be written.

For an erase block in the "fully valid" state 618, the erase block will have the hexadecimal pattern "AA55AA" and its complement written into sectors 0/1 606. Both sectors 2/3 608 and sectors 4/5 610 will contain a valid block identifiers and their complement. The block identifiers indicate the logical address or address range and type of user data written to the erase block. With both sectors 2/3 608 and sectors 4/5 610 containing valid block identifiers, the erase block is considered closed by the EBM control and that no space remains to be written. The fully valid state is an aid to power up initialization, immediately indicating the validity of all sectors of the erase block without further verification.

To better use and manage a Flash memory device of the present invention and its erase blocks, by helping to avoid unnecessary block erasures and floating gate memory cell write fatigue, there are multiple types of erase block uses and block identifiers within a Flash memory device of the present invention. One such erase block use and block identifier type is the Logical Block of Sectors (LBS). In a LBS utilized erase block, the erase block contains a contiguous range of logical sector addresses, much like a conventional magnetic disk block device would. If the LBS utilized erase block is "partially filled", as described above in the table of FIG. 6, only sectors 4/5 will be written with a valid LBS block identifier in the EBM data field. Sectors 2/3 of the LBS utilized erase block will be "erased", and sectors 0/1 will contain the pattern "AA55AA". When all the sectors of a LBS utilized erase block are written, or the remaining sectors of a "partially filled" LBS utilized erase block are written, the erase block is considered full. The LBS utilized erase block will then be marked as being the "fully valid" state by having a valid LBS block identifier written into the EBM data fields of both sectors 2/3 and sectors 4/5.

Another such erase block use and block identifier type is the Block of Repeated Logical Sector Address (RLS). RLS is designed to be utilized by the Flash memory device to conveniently deal with a sector that is heavily written and rewritten by the host while minimizing write fatigue and the number of time consuming block erasures the Flash memory needs to do. In a RLS utilized erase block, the erase block contains a single repeated logical sector. When the logical sector is again written by the host it is simply written to the next available physical sector in the erase block. If the RLS utilized erase block is "partially filled", as described above in the table of FIG. 6, only sectors 4/5 will be written with a valid RLS block identifier in the EBM data field. Sectors 2/3 of the RLS utilized erase block will be "erased", and sectors 0/1 will contain the pattern "AA55AA". When all the sectors of a RLS utilized erase block have written, the erase block is considered full. The RLS utilized erase block can be marked as being the "fully valid" state by having a valid RLS block identifier written into the EBM data fields of both sectors 2/3 and sectors 4/5. Although, the RLS utilized erase block may be optionally left marked as if in the "partially filled" state for, as state above, the "partially filled" state allows for the sectors between 0 and 128 in an erase block to have been written. When a RLS utilized erase block is full, in either the "partially filled" or "fully valid" state, the EMB control will open a new erase block for the logical sector to be written to next and mark the current RLS utilized erase block as having the "invalid" state and ready for erasure by writing the invalid state into all EBM data fields as previously describe in the table of FIG. 6. It is therefore possible for an RLS utilized erase block to go directly from the "partially filled" state, if all 128 sectors filled, to the "invalid" state, thus avoiding having to pass through the "fully valid" state first, potentially reducing Flash operation overhead. Or, alternatively, to sequence from the "partially filled" state, to "fully valid", to the "invalid" state.

Figure 7:
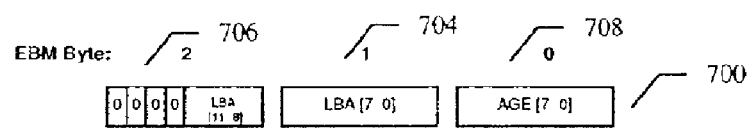
FIG. 7 details the formats of Logical Block of Sectors (LBS) and Repeated Logical Sector (RLS) EBM block identifier field entries of a Flash memory of the present invention.
Figure 7:
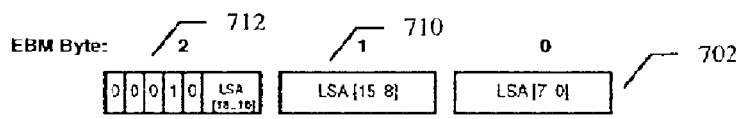

FIG. 7 details the EBM data fields for both a LBS block identifier 700 and a RLS block identifier 702. For simplicity of illustration, only bytes 0, 1, and 2 are shown and the is complement versions in bytes 3, 4, and 5 are omitted.

An LBS block identifier indicates the section of 128 contiguous logical sectors stored in this physical erase block. For embodiments of the present invention, this is accomplished by the 12 bit logical block address (LBA) 704 that is written into bytes 1 and 2 of the EBM data field. The remaining 4 bits of EBM data field byte 2 706 are filled with zeros. The LBS block identifier also contains an 8 bit AGE descriptor 708 in byte 0 of the EBM data field, indicating the validity of the data stored in the erase block. As multiple blocks may be identified on the Flash memory device with the same logical block address, this AGE descriptor is utilized by the EBM control to determine the validity of the stored data and retrieve/operate on the most recent.

An RLS block identifier indicates the logical sector address for the single logical sector of data stored in this physical erase block. As stated above, the same logical sector is written to increasing sector addresses within the erase block. The highest written sector is therefore the most recent data. For this reason there is no "AGE" data for an RLS erase block identifier, for only one will exist for a given logical sector in an RLS utilized erase block at a time. An RLS block identifier for embodiments of the present invention contains a 19 bit logical sector address 710 written into bytes 0, 1, and 2 of the EBM data field. The remaining 5 bits of byte 2 are filled with the bit pattern "00010" 712. It is noted that other variations of block identifiers are possible and should be apparent to those skilled in the art with the benefit of the present disclosure.

Figure 8:
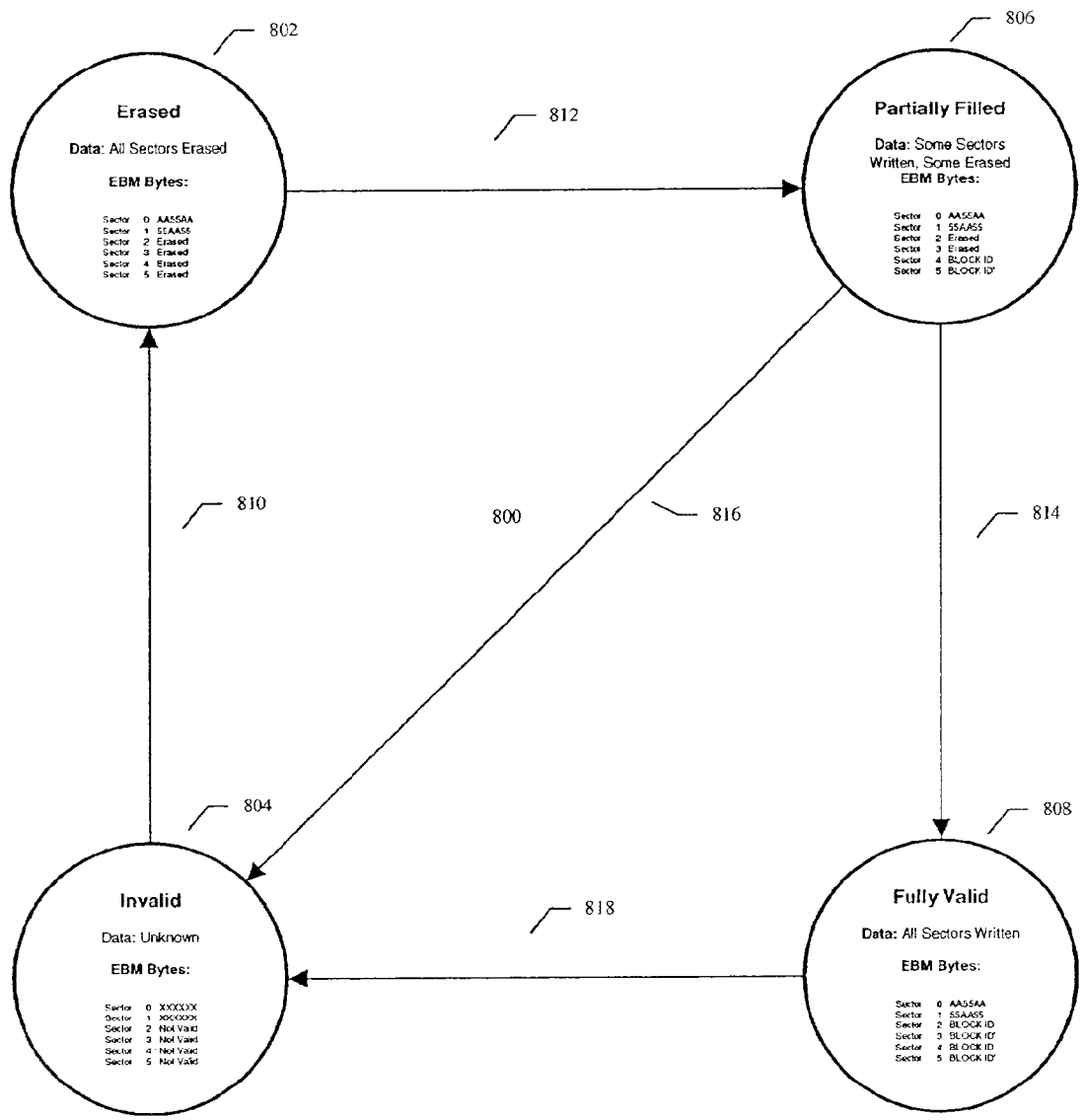
FIG. 8 details an erase block state transition diagram and EBM sector field values for a Flash memory of the present invention.

FIG. 8 details an erase block state transition diagram 800 for Flash memory devices of the present invention, showing the "erased" 802, "invalid" 804, "partially filled" 806, and "fully valid" 808 states and their allowed previous and next states. Also detailed are the contents of the EBM data fields of the first six sectors of the erase block when the erase block is in each state. As shown in FIG. 8, the "erased" state 802 can only be entered from the "invalid" state 804 after a successful erase operation 810. The "erased" state 802 can then be exited by a transition to the "partially filled" state 806 when data is written to the physical sectors of the erase block 812. As described above, the "partially filled" state 806 can be exited by either transitioning to the "fully valid" state 808, by filling the remaining sectors of the erase block 814, or by transitioning directly to the "invalid" state 804. Therefore saving overhead by not having to transition through the "fully valid" state 808 first if there is no need to keep the data in the erase block. The "fully valid" state 808 can be exited by transitioning back to the "invalid" state 804, when the erase block data is no longer necessary 818.

Erase Block Management firmware utilizes the following RAM data variable structures in control of the erase blocks of an embodiment of the Flash memory device of the present invention: lba_to_pba[lba], open_block_id[index], open_block_flags[index], open_block_count[index], block_invalid_flags[block], block_erased_flags[block]. The index utilized to access the RAM data structure is shown in brackets in the above listing. These tables are primarily shown as a guide to understanding the present invention and should not be regarded as limiting.

Figure 9:
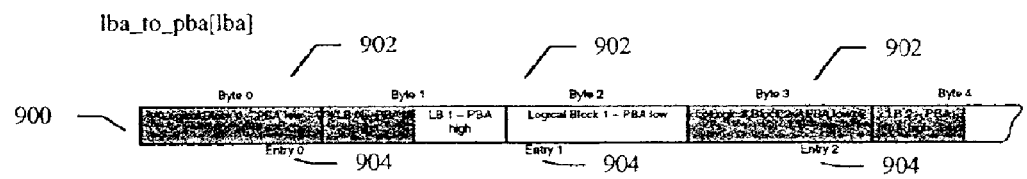
FIG. 9 details a logical block address to physical block address RAM table of a Flash memory of the present invention.

The lba_to_pba RAM table, shown in FIG. 9, is a randomly addressable array 900 of 12 bit Physical Block Addresses (PBA) 902 indexed by a logical block address (LBA) value 904 (lba_to_pba[lba]). An entry of 0xFFF in the array 900 indicates that the LBA has no corresponding PBA present. On power-up this table is initialized to all 0xFFF and filled with LBA to PBA mappings as the EBM data fields are read from the individual erase blocks. In operation, an entry is placed in this table when a physical erase block is transitioned into the "fully valid" state.

Figure 10:
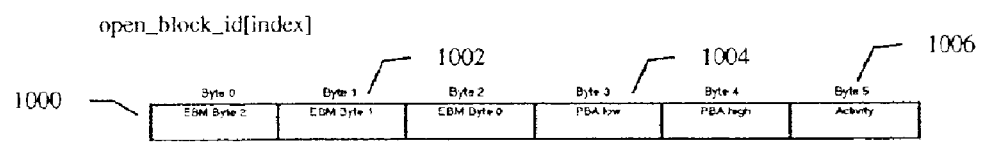
FIG. 10 details an open block identifier RAM table of a Flash memory of the present invention.

The open_block_id RAM table, an entry 1000 of which is shown in FIG. 10, contains the block identifier information (EBM) 1002 and physical block address (PBA) 1004 for all "partially filled" state erase blocks in the Flash memory device as well as an activity indication 1006 for the entry itself. Each entry is 6 bytes in size 1000 and accessed by an index value (open_block_id[index]). Entries are ordered by address and age. The most recently updated entry is given an activity value of 0 and all other activity values are incremented. An entry of all 'FF's is invalid and power-up initializes this table to invalid entries. The open_block_id RAM table is filled during the initialization with erase blocks in the "partially filled" state as the EBM data fields are read from the individual erase blocks.

Figure 11:
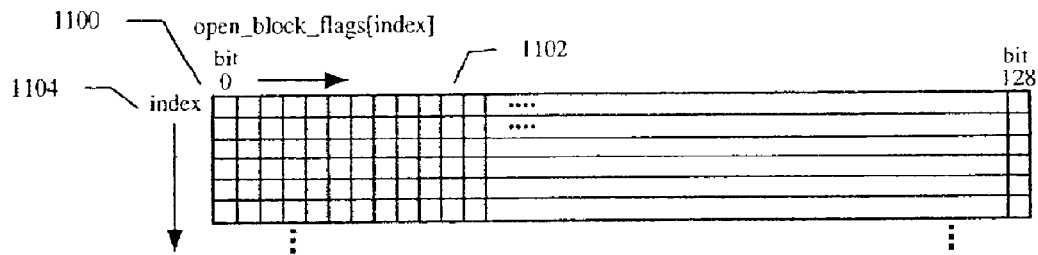
FIG. 11 details an open block flags RAM table of a Flash memory of the present invention.

The open_block_flags table 1100, shown in FIG. 11, contains 128 bit flags 1102 for each "partially filled" erase block of the Flash memory device. The table represents each "partially filled" erase block that is present on the Flash memory device or Flash card. The open_block_flags table is accessed by an index value 1104 (open_block_flags[index]). A bit flag 1102 is set to 1 for each sector in the erase block which contains valid data. This table is initialized to all zeros on power-up and filled as the EBM data fields are read and "partially filled" erase blocks identified and scanned for all sectors that contain valid data.

Figure 12:
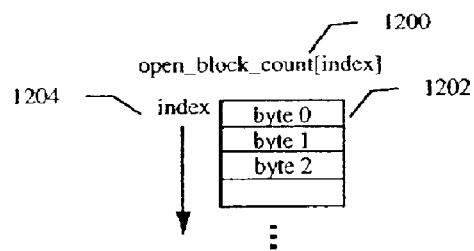
FIG. 12 details an open block count RAM table of a Flash memory of the present invention.

The open_block_count table 1200, a representation of which shown in FIG. 12, indicates the number of valid sectors in each "partially filled" erase block on the Flash memory device or Flash card. Each entry is a single byte 1202 and is accessed by an index value 1204 (open_block_count[index]). This table is initialized to all zeros on power-up and filled as the EBM data fields are read and "partially filled" erase blocks identified and scanned for all sectors that contain valid data.

Figure 13:
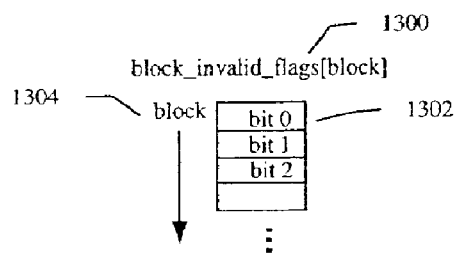
FIG. 13 details a block invalid flags RAM table of a Flash memory of the present invention.

The block_invalid_flags table 1300, a representation of which shown in FIG. 13, contains a bit flag 1302 for each physical erase block on the card. The block_invalid_flags table is accessed by an erase block identifier 1304 (block_invalid_flags[block]). A bit flag 1302 is set to 1 for each erase block which is in the "invalid" state. This table is initialized to all zeros on power-up and filled as the EBM data fields are read and "invalid" state erase blocks identified.

Figure 14:
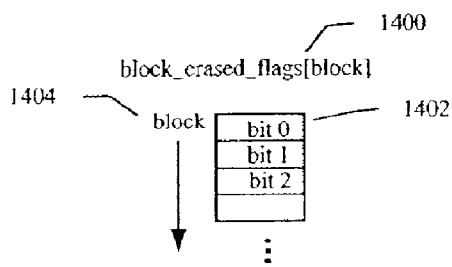
FIG. 14 details a block erased flags RAM table of a Flash memory of the present invention.

The block_erased_flags table 1400, shown in FIG. 14, contains a bit flag 1403 for each physical erase block on the card. The block_erased_flags table is accessed by an erase block identifier 1304 (block_erased_flags[block]). A bit flag 1302 is set to 1 for each block which is in the "erased" state. This table is initialized to all zeros on power-up and filled as the EBM data fields are read and erase blocks in the "erased" state identified.

The functions of erase block management firmware of a Flash memory device of the present invention are summarized in the following descriptions of the different processes of Initialization, Read Location, and Write Allocation.

Initialization: during power-up initialization, the Flash memory RAM tables are first filled with their power-up default values. The state of all erase blocks is then determined and recorded in controller RAM tables by reading the EBM data fields of all erase blocks on the card or Flash memory device to determine each erase block's state and logical block address information. The lba_to_pba, open_block_id, block_invalid_flags and block_erased_flags tables are updated using this information.

All sectors of each "partially filled" erase block located in the previous sub-process are read to determine the valid state of sectors within the erase block in order to update the open_block_flags and open_block_count tables.

Read Location: in order to perform a read command and return a written sector data to the host, erase block management control must locate the requested sector data on the Flash memory device. The Read Location process will be given an input start logical sector address (LSA) and a Sector Count from the host. The Read Location process then returns with an indication of successful location of data (or not) and, if data is located, a starting Chip, Block and Sector location as well as a Sector Count. The returned count will be equal to or less than the requested count.

The RAM open_block_id and open_block_flags tables are first searched for the requested data. Repeated logical sector (RLS) entries are considered by default to be the most recent. Logical blocks of sectors (LBS) entries have the AGE parameter allowing the most recent data to be identified. Entries which locate some of the requested data, but not the first requested sector, force the sector count to be clipped to a value which will exclude sectors in that entry.

Any request not located in the erase blocks with a "partially full" state is next searched for in the lba_to_pba table of erase blocks with a "fully valid" state. When no entry is present, then the Read Location process returns with the indication that data was not located.

Write Allocation: in order to perform a write command and write host supplied sector data to the Flash memory device, the erase block management control must allocate the requested erased sector space on the Flash memory. The Write Allocation process will be given an input starting logical sector address (LSA) and a Sector Count from the host. The Write Allocation process then returns with an indication of successful allocation of space (or not) and, if space is allocated, a starting Chip, Block and Sector location as well as a Sector Count is returned. The returned count will be equal to or less than the requested count.

In a Write Allocation, the RAM open_block_id and open_block_flags tables are initially searched for space in a "partially filled" state erase block for the requested sectors. Repeated logical sector (RLS) utilized erase blocks are selected over logical blocks of sectors (LBS) utilized erase blocks by default. If multiple LBS entries are present and applicable to the requested LSA, then only the most recent in AGE is searched. If no space is found for at least the first requested sector in the current "partially filled" state erase blocks, then a new "partially filled" erase block must be opened.

A new "partially filled" erase block is "opened" by first searching the open_block_id table for the correct ordered location and AGE to use for the new entry. A physical erase block in the "erased" state is selected. This information is entered into the correct entry position in the open_block_id table. The open_block_flags bits for this entry are set to all zeros and the Activity value of this entry is set to 0. The Activity value of all other entries is incremented, up to a maximum value of 20. The selected physical erase block's Partial EBM data field (sectors 4/5) is written.

If no space is available in the open_block_id table for a new entry, then an entry in this table must be closed, If no physical erase block in the "erased" state is available, then an erase block in the "invalid" state must be erased in an erasure procedure. If no erase blocks in the "invalid" state are available, then an entry in the open_block_id table must be closed.

Closing an erase block in the "partially filled" state is fundamentally the process of removing its entry from the open_block_id table. The processes of accomplishing this are the most complicated in erase block management firmware and differs depending on the type of erase block in the "partially filled" state involved and the number of other erase block in the "partially filled" state open at the time.

An erase block in the "partially filled" state, with sectors for an LBA which is currently not open in any other erase block, is closed by writing any remaining unwritten sectors using data from any currently existing erase block in the "fully valid" state that contains this data. The erase block in the "fully valid" state is invalidated by programming its EBM data field entries to "invalid". Its PBA location is then marked in the block_invalid_flags table. The "partially filled" erase block is then marked as in the "fully valid" state through its EBM data field entries and entered into the lba_to_pba table. Finally, the newly closed erase block is removed from the open_block_id table, removing its entry.

An erase block in the "partially filled" state that contains sectors of an LBA open in other "partially filled" erase blocks, and thus have open_block_id entries, can only be closed if it is the oldest entry (its AGE value is the lowest for that LBA). It is closed by writing any valid sectors in its block for which no valid sectors in younger blocks appear into the youngest block for this LBA. The "partially filled" erase block can now be invalidated by programming its EBM entries. Its entry in the open_block_id table can then be invalidated.

A Repeated Logical Sectors (RLS) utilized erase block in the "partially filled" state is closed by first moving its content of the single most recent data sector it contains into an Logical Block of sectors (LBS) utilized erase block in the "partially filled" state. The physical RLS utilized erase block is then invalidated and marked in the block invalid_flags and the entry in the open_block_id table is then removed.

This process is straight-forward if an LBS utilized erase block in the "partially filled" state is already open to receive the sector data needed to be moved. If no such block is open (or it does not have space for the sector) then this process becomes convoluted. A new LBS utilized erase block has to actually be opened to receive the data. In this case, the Repeated Logical Sector (RLS) entry is removed from the open_block_id table, but it is actually replaced by an new LBS entry. Note: the typical purpose for closing a block is to make an entry available in the open_block_id table. The last type of block closure described does not accomplish this by itself and requires a follow-up closure of another block (or even more than 1) to make an open_block_id entry available.

Erased Block Selection: an erase block in the "erased" state is selected, for purposes of opening a "partially filled" state erase block, by searching the block_erased_flags table for a non-zero flag bit. For purposes of leveling wear among the erase blocks of the Flash memory device or card, a new search through this table will always begin at the block after the last search completed. This process will return with an indication of success or failure in locating an erased block, and the physical block address located if successful.

Invalid Block Selection: an erase block in the "invalid" state is selected for erasure by searching the block_invalid_flags table for a non-zero flag bit. For purposes of leveling wear among the Erase Blocks of the Flash memory device or card, a new search through this table will always begin at the block after the last search completed. This process will return with an indication of success or failure in locating an invalid block. The process will return also with the physical block address (PBA) located if successful.

CONCLUSION

An improved Flash memory device with a distributed erase block management (EBM) scheme has been detailed that enhances operation and helps minimize write fatigue of the floating gate memory cells of the Flash memory device. In the prior art, erase block management of a Flash memory device, which provides logical sector to physical sector mapping and provides a virtual rewriteable interface for the host, requires that erase block management data be kept in specialized EBM data tables to keep the state of the Flash memory device in case of loss of power. This placement of EBM data in a separate erase block location from the user data slows the Flash memory operation by requiring up to two writes and/or block erasures for every update of the user data. Additionally, one of the goals of the EBM control is to minimize write fatigue of the non-volatile floating gate memory cells of the Flash memory device erase blocks by re-mapping and distributing heavily rewritten user data sectors in a process called load leveling so that no one erase block gets overused too quickly and reduce the expected lifespan of the Flash memory device. The EBM data structures, however, are some of the most heavily rewritten non-volatile floating gate memory cells in the device and thus, while helping to reduce write fatigue in the Flash memory device, are some of the data structures most susceptible to the process of fatigue. The Flash memory device of the detailed invention combines the EBM data in a user data erase block by placing it in an EBM data field of the control data section of the erase block sectors. Therefore distributing the EBM data within the Flash memory erase block structure. This allows the detailed Flash memory to update and/or erase the user data and the EBM data in a single operation, reducing overhead and speeding operation. The detailed Flash memory also reduces the process of EBM data structure write fatigue by allowing the EBM data fields to be load leveled by rotating them with the erase blocks they describe.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A Flash memory device comprising:
   a control circuit;
   a memory array with a plurality of floating gate memory cells arranged in a plurality of erase blocks, wherein each erase block of the plurality of erase blocks contains 128 sectors, and each sector contains a user data section of 512 bytes and a control data section;
   an erase block management data structure formed into the control data section of a first six sectors of each erase block of the plurality of erase blocks, wherein each control data section of the first six sectors contains a 6 byte erase block management data field, where the 6 byte erase block management data fields of the first six sectors contain a plurality of differing erase block management data structures for storage of data to manage the status of two or more sectors of the erase block within the memory array; and
   a plurality of RAM control registers.

2. The Flash memory device of claim 1, wherein a first 3 bytes of the 6 byte erase block management data field contain an erase block management data and a second 3 bytes of the 6 byte erase block management data field contain a 1s complement converted copy of the erase block management data of the first 3 bytes.

3. The Flash memory device of claim 1, wherein the first six sectors of each erase block of the plurality of erase blocks are arranged into 3 groups of 2 sector pairs, wherein both sectors of each 2 sector pair contains a complete copy of a erase block management data stored in the 2 sector pair.

4. A Flash memory device comprising:
   a memory array containing a plurality of floating gate memory cells arranged in a plurality of erase blocks, wherein each of the plurality of erase blocks is further arranged into a plurality of sectors, each sector of the plurality of sectors having a user data section and a control data section; and
   an erase block management data structure for storage of data to manage the status of two or more sectors of an erase block within the memory array arranged in the control data sections of a subset of sectors of each erase block of the plurality of erase blocks.

5. The Flash memory device of claim 4, wherein the control data sections of the subset of sectors contain a plurality of differing erase block management data fields.

6. The Flash memory device of claim 4, wherein the erase block management data structure is configured in a fault tolerant data structure.

7. The Flash memory device of claim 6, wherein the fault tolerant data structure is an erase block management data field and a 1s complement copy of the erase block management data field.

8. The Flash memory device of claim 6, wherein the fault tolerant data structure is a copy in a second sector of the erase block of an erase block management data field contained in a first sector of the erase block.

9. A Flash memory device comprising:
   a memory array containing a plurality of floating gate memory cells divided into a plurality of erase blocks, wherein each of the plurality of erase blocks is further divided into a plurality of sectors, each sector of the plurality of sectors having a user data section and a control data section; and
   an erase block management data structure for storage of data to manage the status of two or more sectors of the erase block within the memory array arranged in the control data sections of a first set of sectors of each erase block of the plurality of erase blocks.

10. The Flash memory device of claim 9, wherein the control data section of each sector of the first set of sectors has an erase block management data field.

11. The Flash memory device of claim 10, wherein the erase block management data fields of the first set of sectors contain a plurality of differing the erase block management data.

12. The Flash memory device of claim 10, wherein the erase block management data field is a six byte data field.

13. The Flash memory device of claim 9, wherein the first set of sectors of the plurality of sectors comprises a first six sectors of each erase block of the plurality of erase blocks.

14. A Flash memory device comprising:
    a memory array containing a plurality of floating gate memory cells arranged in a plurality of erase blocks, wherein each of the plurality of erase blocks is further divided into a plurality of sectors, each sector of the plurality of sectors having a user data section and a control data section; and
    an erase block management data structure arranged in the control data sections of a subset of sectors of each erase block of the plurality of erase blocks for storage of data to manage the status of two or more sectors of the erase block within the memory array, wherein each erase block of the plurality of erase blocks has an erase block state that is recorded in the erase block management data structure of the erase block.

15. The Flash memory device of claim 14, wherein the erase block state is one of "erased", "invalid", "partially filled", or "fully valid".

16. The Flash memory device of claim 15, wherein the erase block state is allowed to transition directly from the "partially filled" state to the "invalid" state.

17. The Flash memory device of claim 14, wherein each erase block of the plurality of erase blocks contains a contiguous range of logical sector addresses.

18. The Flash memory device of claim 14, wherein each erase block of the plurality of erase blocks contains a single logical sector address that is repeated within the erase block.

19. A Flash memory device comprising:
    a memory array containing a plurality of floating gate memory cells arranged in a plurality of erase blocks, wherein each of the plurality of erase blocks is further divided into a plurality of sectors, each sector of the plurality of sectors having a user data section and a control data section;
    a control circuit; and
    an erase block management data structure arranged in the control data sections of a first set of sectors of each erase block of the plurality of erase blocks, wherein the control circuit is adapted to store data to manage the usage status of two or more sectors of the erase block within the memory array in the erase block management data structure of each erase block.

20. The Flash memory device of claim 19, wherein the control circuit stores equivalents of the erase block management data structures of each erase block of the plurality of erase blocks into a RAM data structure.

21. The Flash memory device of claim 19, wherein the control circuit maps a logical address to a physical address of the plurality of erase blocks.

22. The Flash memory device of claim 19, wherein the control circuit manages a state of each erase block and erase block management data structure of the plurality of erase blocks.

23. The Flash memory device of claim 22, wherein the erase block management data structure of each individual erase block of the plurality of erase blocks contains erase block management data for the individual erase block.

24. A The Flash memory device of claim 22, wherein each erase block and erase block management data structure of the plurality of erase blocks is written with an updated user data and an updated erase block management data with a single erase block write operation.

25. A system comprising:
   a host coupled to a Flash memory device, wherein the Flash memory device comprises,
      a memory array containing a plurality of floating gate memory cells arranged in a plurality of erase blocks, wherein each of the plurality of erase blocks is further divided into a plurality of sectors, each sector of the plurality of sectors having a user data section and a control data section; and
      an erase block management data structure for storage of data to manage the status of two or more sectors of the erase block within the memory array arranged in the control data sections of a subset of sectors of each erase block of the plurality of erase blocks.

26. The system of claim 25, wherein the Flash memory device appears to the host as a rewriteable storage device.

27. The system of claim 25, wherein the host is a processor.

28. The system of claim 25, wherein the host is a computer system.

29. The system of claim 25, wherein an interface to the Flash memory device is compatible with a mass storage device.

30. The system of claim 25, wherein an interface to the Flash memory device is a PCMCIA-ATA compatible interface.

31. A method of making a Flash memory device comprising:
   forming a memory array containing a plurality of floating gate memory cells arranged in
      a plurality of erase blocks, wherein each of the plurality of erase blocks is further divided into a plurality of sectors, each sector of the plurality of sectors having a user data section and a control data section; and
   forming an erase block management data structure for storage of data to manage two or more sectors and/or erase block status within the memory array in the control data sections of a subset of sectors of each erase block of the plurality of erase blocks.

32. A method of operating a Flash memory device comprising:
   storing an erase block management data structure for storage of data to manage two or more sectors and/or erase block status in each erase block of a plurality of erase blocks of a Flash memory array, wherein each erase block contains a plurality of sectors and the erase block management data structure of each erase block is stored in a plurality of control data sections of a subset of the plurality of sectors, where each sector of the plurality of sectors contains a user data section and a control data section.

33. The method of claim 32, wherein storing the erase block management data structure further comprises storing the erase block management data structure in an erase block management data field of each control data section of the subset of sectors.

34. The method of claim 33, wherein storing the erase block management data structure in an erase block management data field of each control data section of the subset of sectors further comprises storing an erase block management data value in a control data section of the subset of sectors.

35. The method of claim 33, wherein storing the erase block management data structure in an erase block management data field of each control data section of the subset of sectors further comprises storing an erase block management data value in a 6 byte data field of each control data section of the subset of sectors.

36. The method of claim 32, wherein storing the erase block management data structure further comprises storing a plurality of differing erase block management data in the control data sections of the subset of sectors of each erase block.

37. The method of claim 32, wherein storing the erase block management data structure in a subset of the plurality of sectors of each erase block further comprises storing the erase block management data structure in control data sections of an initial 6 sectors of the erase block.

38. A method of operating a Flash memory device comprising:
   storing a fault tolerant erase block management data structure in a plurality of sectors of each erase block of a plurality of erase blocks of a Flash memory array, wherein the erase block management data structure stores data to manage two or more sectors and/or erase block status within the memory array and where each erase block contains a plurality of sectors and the erase block management data structure of each erase block is stored in a plurality of control data sections of a subset of the plurality of sectors, where each sector of the plurality of sectors contains a user data section and a control data section.

39. The method of claim 38, wherein storing the fault tolerant erase block management data structure in the plurality of sectors of each erase block of the plurality of erase blocks further comprises storing a component of the erase block management data structure in a first erase block management data field of a first control data section and a 1s complement copy of the component of the erase block management data structure in a second erase block management data field of a second control data section.

40. The method of claim 38, wherein storing the fault tolerant erase block management data structure in the plurality of sectors of each erase block of the plurality of erase blocks further comprises storing a copy of an erase block management data field contained in a first control data section of the erase block in a second control data section of the erase block.

41. A method of operating a Flash memory device comprising:
   placing an erase block management data structure in a control data section of a subset of sectors of a plurality of sectors of each erase block of a plurality of erase blocks of a Flash memory array, wherein the erase block management data structure stores data to manage two or more sectors and/or erase block status within the memory array, and where each sector of the plurality of sectors contains a user data section and a control data section; and recording an erase block state in the erase block management data structure in the control data section of the subset of sectors of each erase block of the plurality of erase blocks.

42. The method of claim 41, wherein recording the erase block state in the erase block management data structure in the control data section of the subset of sectors of each erase block of the plurality of erase blocks further comprises recording an erase block identifier that identifies erase block format and content in the erase block management data structure in the control data section of the subset of sectors of each erase block of the plurality of erase blocks.

43. The method of claim 42, wherein recording the erase block identifier further comprises recording an erase block identifier that identifies the erase block as containing a contiguous range of logical sector addresses.

44. The method of claim 42, wherein recording the erase block identifier further comprises recording an erase block identifier that identifies the erase block as containing a single logical sector address that is repeated within the erase block.

45. The method of claim 41, wherein recording the erase block state in the erase block management data structure in the at least one sector of each erase block of the plurality of erase blocks further comprises recording the erase block state as one of "erased", "invalid", "partially filled", or "fully valid".

46. The method of claim 45, wherein recording the erase block state further comprises allowing the erase block state to transition directly from "partially filled" to "invalid".

47. The method of claim 41, wherein recording the erase block state in the erase block management data structure in the control data section of the subset of sectors of each erase block of the plurality of erase blocks further comprises recording the erase block state with an erase block operation that writes both a user data and the erase block management data in a single write operation.

48. The method of claim 41, further comprising storing the contents of the erase block management data structures of each erase block of the plurality of erase blocks into a RAM data structure.

49. A method of operating a Flash memory device comprising:

placing an erase block management data structure in a control data section of a subset of sectors of a plurality of sectors of each erase block of a plurality of erase blocks of a Flash memory array, wherein the erase block management data structure stores data to manage two or more sectors and/or erase block status within the memory array, and where each sector of the plurality of sectors contains a user data section and a control data section; and mapping a logical address to a physical erase block and a sector address of the plurality of erase blocks.

50. The method of claim 49, wherein mapping the logical address to the physical erase block and sector address of the plurality of erase blocks further comprises managing a state of each erase block and erase block management data structure.

* * * * *

UNITED STATES PATENT AND TRADEMARK OFFICE
CERTIFICATE OF CORRECTION

PATENT NO.    : 6,948,026 B2
DATED         : September 20, 2005
INVENTOR(S)   : Keays, Brady It is certified that error appears in the above-identified patent and that said Letters Patent is hereby corrected as shown below:

Column 8,
Line 26, "of illustration, only bytes 0, 1, and 2 are shown and the is" should read -- of illustration, only bytes 0, 1, and 2 are shown and the 1's --.

Column 14,
Line 49, "a memory array containing a plurality of floating gale" should read -- a memory array containing a plurality of floating gate --.

Column 16,
Line 46, "gate memory cells arranged in" should read -- gate memory cells arranged in a plurality of erase --.

Signed and Sealed this

Fourteenth Day of March, 2006

JON W. DUDAS
*Director of the United States Patent and Trademark Office*